Aug. 16, 1932.   G. C. GOODE ET AL   1,872,442
AUTOMOTIVE VEHICLE CHASSIS
Filed Jan. 29, 1930   2 Sheets-Sheet 1
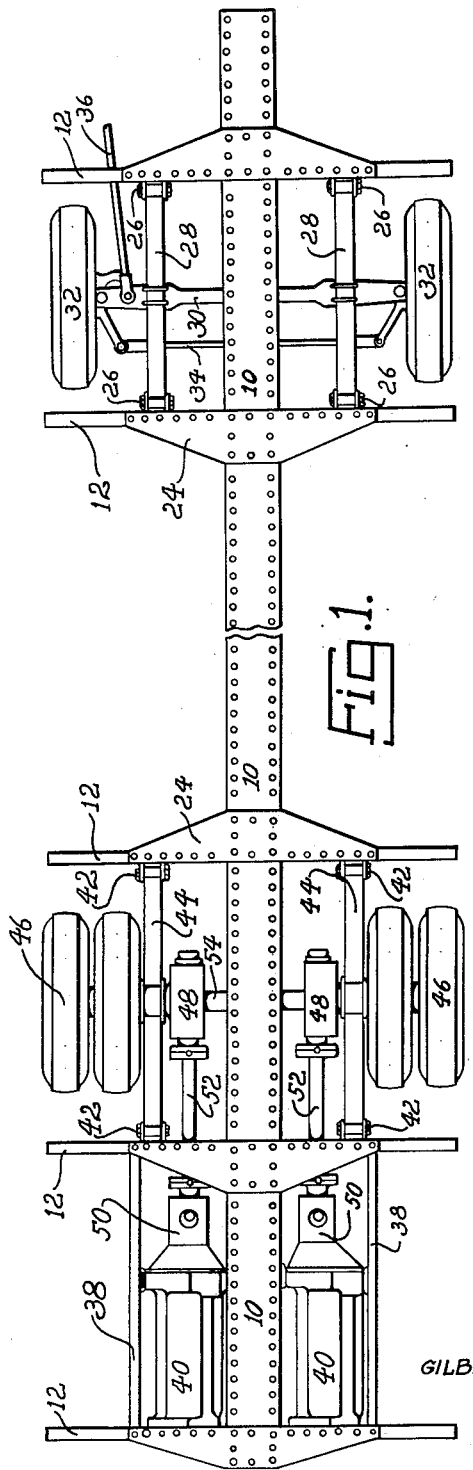
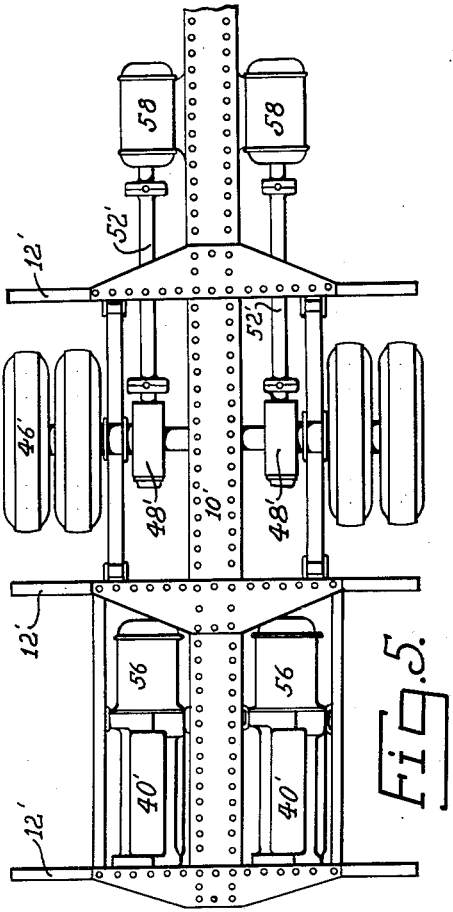
INVENTORS
GILBERT C. GOODE, FREDERICK A. SELJE AND
CLARENCE W. MILLER.
BY
ATTORNEY

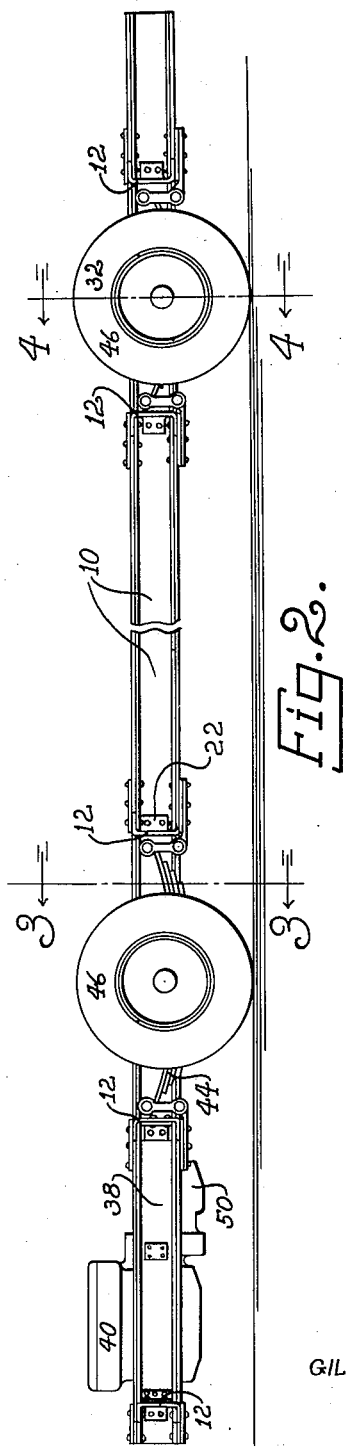
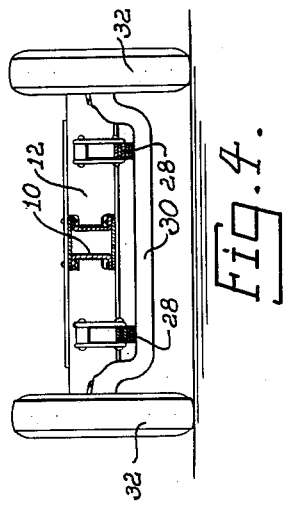
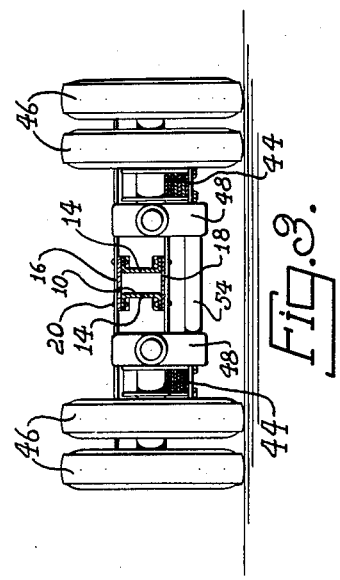

Patented Aug. 16, 1932

1,872,442

UNITED STATES PATENT OFFICE

GILBERT C. GOODE, OF BIRMINGHAM, AND FREDERICK A. SELJE AND CLARENCE W. MILLER, OF DETROIT, MICHIGAN, ASSIGNORS TO CHRYSLER CORPORATION, OF DETROIT, MICHIGAN, A CORPORATION OF DELAWARE

AUTOMOTIVE VEHICLE CHASSIS

Application filed January 29, 1930. Serial No. 424,358.

This invention relates to a vehicle chassis and has for one of its objects the provision of a supporting structure by which the arrangement of parts is capable of supporting heavy loads, and to provide such a structure with the weight of the frame reduced to a minimum.

Another object of the invention is to provide a chassis frame member in which the frame members are arranged to resist torsional strains. One desirable form consists of a hollow frame member which extends longitudinally of the chassis and is centrally located.

A further object of the invention is to provide a novel frame structure in combination with a driving mechanism which is located at the rear of the vehicle and in a specific embodiment of the invention, two independent power transmitting units are arranged, one on each side of the vehicle.

Other objects and advantages of the invention will more fully appear from the following description taken in connection with the accompanying drawings, in which:

Fig. 1 is a plan view showing a preferred embodiment of our invention.

Fig. 2 is a side elevation of Fig. 1.

Fig. 3 is a sectional view taken on line 3—3 of Fig. 2.

Fig. 4 is a sectional view taken on line 4—4 of Fig. 2.

Fig. 5 is a fragmentary view, showing in plan a portion of the rear end of the chassis wherein we have illustrated a modified form of a driving mechanism.

Referring to the drawings, we have shown a frame structure comprising a central beam 10 extending longitudinally of the chassis and a plurality of transversely extending frame members 12. Referring to Fig. 3, the central beam 10 is made up from a pair of channels 14 arranged back to back and spaced apart. Secured to the side flanges of the channels 14 are upper and lower plates 16 and 18, respectively, which, when secured together, such as by rivets 20, form a hollow beam rectangular in cross section.

The frame members 12 are preferably made from channel members extending outwardly and at right angles to the central beam 10. These channels may be secured to the channels 14 by an inwardly turned flange 22, on one end of the channel 12, which is riveted to the channel 14. To further strengthen the channels 12, we have provided gusset plates 24 which are riveted to the upper and lower surfaces of the central beam 10 and to the side flanges of the channel 12.

Between two adjacent frame members 12, at the forward end of the chassis, spring shackles 26 have been arranged on the channels 12 which support a vehicle spring 28, shown as the semi-elliptical type. A front axle 30 is secured to the central portion of the spring 28 and steering wheels 32 are pivotally supported on the outer ends of the axle 30. A connecting rod 34 ties the two wheels together and a drag link 36 is shown as a conventional means for pivoting the steering wheels 32.

At the rear of the frame and on opposite sides of the central beam 10 we have provided reinforcing members 38 extending between two adjacent frame members 12 and parallel to the central beam 10. Between the reinforcing members 38 and the beam 10 we have provided a motor 40, shown as an internal combustion engine, one on each side of the central beam 10. Between adjacent frame members 12, in front of the cross members to which the motor is secured, we have arranged spring shackles 42 adapted to support semi-elliptical springs 44 which support driving wheels 46. Suitable driving mechanism 48 is provided adjacent the wheels 46. The drive from the motor 40 is transmitted to the driving mechanism 48 through a transmission 50 and a propeller shaft 52. The housings for the two sets of driving mechanisms 48 are rigidly connected by a member 54 extending under the central beam 10.

It will be understood that we have provided separate driving units, one on each side of the central beam member 10, each consisting of a motor 40, a transmission 50, drive shaft 52 and driving mechanism 48.

Referring to Fig. 5 wherein a modified construction is shown, an internal combustion engine 40' is supported between the laterally extending frame members 12', and in place of the transmission 50, shown in Fig. 1, we have substituted an electric generator 56, beyond the driving wheels 46'. An electric motor 58 is mounted on the frame member 10'. The power transmitting mechanism, similar to that shown at 48 in Fig. 1 is shown at 48', and is turned at 180° so that the drive for the wheels is in front of the wheels with the power generating mechanism at the rear of the wheels.

No attempt has been made to illustrate the electrical connection between the generator 56 and the motor 58, as it will be understood that the electrical conductors, controls and storage batteries are provided to transmit electrical energy from the generator 56 to the motor 58, and that inasmuch as the drawing is diagrammatic and illustrates the arrangement of parts, it is felt that such a showing is unnecessary. In this form of our device separate power transmitting means are provided, one on each side of the central beam member 10'. The rear wheel 46', on one side of the central beam member, is driven independently by one power transmitting unit and the wheel on the opposite side of the central beam 10' is driven independently by the other power transmitting unit. Where the chassis is to be used for heavy duty, two tires are shown on the driving wheels on each side of the chassis.

Various changes, including the size, shape and arrangement of parts, may be made without departing from the spirit of our invention. It will be understood that while we have shown a chassis for supporting a truck or bus body, its application is not limited to such vehicles and that the same may be modified so as to be used for a pleasure vehicle without departing from the spirit of our invention, and it is our intention to cover by our claims such changes as may be reasonably included within the scope of our invention.

What we claim is:

1. A vehicle chassis having a frame which comprises a central beam member extending longitudinally of the chassis and laterally projecting frame members, a power transmitting unit on each side of said central beam and at the end thereof comprising an engine, a transmission, a wheel and a driving connection between said transmission and said wheel, a rigid support between said wheels resiliently mounted on said frame, and steering wheels at the opposite end of said beam.

2. A vehicle chassis having a frame which comprises a central beam member and transverse frame members, the upper surface of said central beam being in a horizontal plane, a driving axle and wheels adjacent one end of said beam, a steering axle and wheels adjacent the opposite end of said beam, a power transmitting unit between the rear end of the frame and said driving axle, the upper surface of said beam and its transverse frame members being unobstructed in a horizontal plane from a point adjacent the driving axle to the forward end of said beam.

3. A vehicle chassis having a frame which comprises a central beam member and transverse frame members, a steering axle resiliently supported on transverse members of said frame adjacent the forward end of said frame, a driving axle having two driven units resiliently supported on transverse members of said frame adjacent the rear end of said frame, internal combustion engines, one on each side of the central beam member of said frame, supported on transverse members of said frame and having their longitudinal center in a direction parallel to the longitudinal direction of said frame, said engines being positioned rearwardly of said driving axle, a transmission for each engine between the engine and said driving axle, a propeller shaft for each transmission between said transmission and said driving axle, and a driving mechanism between each propeller shaft forming a driving unit of said driving axle.

4. A vehicle chassis comprising, a central longitudinal beam, a pair of laterally projecting frame members adjacent the forward end of said beam, a steering axle resiliently supported by said laterally projecting frame members, a pair of laterally projecting frame members adjacent the rear end of said beam, a power unit having an engine and a transmission supported by said last named pair of frame members on opposite sides of said beam, another laterally projecting frame member adjacent the rear pair of frame members, a rigid axle, a resilient connection between said rigid axle and two of said last named frame members, a driving wheel at each of the opposite ends of said driving axle, and a driving connection between each power unit and each of said driving wheels.

GILBERT C. GOODE.
FREDERICK A. SELJE.
CLARENCE W. MILLER.